US012595010B2

(12) United States Patent
Liu

(10) Patent No.: US 12,595,010 B2
(45) Date of Patent: Apr. 7, 2026

(54) BIKE TRAILER FRAME STRUCTURE

(71) Applicant: Cheh-Kang Liu, Taipei (TW)

(72) Inventor: Cheh-Kang Liu, Taipei (TW)

( * ) Notice: Subject to any disclaimer, the term of this patent is extended or adjusted under 35 U.S.C. 154(b) by 404 days.

(21) Appl. No.: 18/384,420

(22) Filed: Oct. 27, 2023

(65) Prior Publication Data

US 2025/0136217 A1 May 1, 2025

(51) Int. Cl.
*B62J 7/00* (2006.01)

(52) U.S. Cl.
CPC ....................................... *B62J 7/00* (2013.01)

(58) Field of Classification Search
CPC ........... B62J 7/00; B62K 27/003; B62K 27/02
See application file for complete search history.

(56) References Cited

U.S. PATENT DOCUMENTS

| | | | | |
|---|---|---|---|---|
| 5,829,770 A | * | 11/1998 | Chiu | B62K 27/16 |
| | | | | 280/204 |
| 6,547,115 B1 | * | 4/2003 | Kato | B60R 9/06 |
| | | | | 224/311 |
| 2012/0161426 A1 | * | 6/2012 | Nishiyama | B62J 7/00 |
| | | | | 280/769 |
| 2015/0060636 A1 | * | 3/2015 | Erickson | F16M 11/24 |
| | | | | 248/670 |

FOREIGN PATENT DOCUMENTS

| | | | |
|---|---|---|---|
| CN | 202414068 | * | 9/2012 |
| CN | 210101765 | * | 2/2020 |
| CN | 216734103 | * | 6/2022 |

OTHER PUBLICATIONS

CN 202414068 English Translation (Year: 2012).*
CN 216734103 English Translation (Year: 2022).*
CN 210101765 English Translation (Year: 2020).*

* cited by examiner

*Primary Examiner* — Russell Frejd
(74) *Attorney, Agent, or Firm* — Demian K. Jackson; Jackson IPG PLLC

(57) ABSTRACT

A bike trailer frame structure includes a rear frame and a base frame. The rear side of the base frame is mounted with left and right pivot bases, that have a fixing hole (fixing groove) respectively connected to the bottom side of the rear frame through a respective positioning element. Thereby, when the right positioning elements are released, the rear frame can pivot toward the base frame and fold, or can pivot in the direction opposite to the base frame, and then fix the positioning elements to the fixing holes or fixing grooves of the pivot bases to complete the unfolding action. Therefore, the invention simplifies the folding structure of the rear frame and the base frame in the front and rear directions. It has the practicality of streamlined components, uncomplicated manufacturing, simple and convenient assembly, and saving transportation space.

6 Claims, 6 Drawing Sheets

BIKE TRAILER FRAME STRUCTURE

BACKGROUND AND SUMMARY OF THE INVENTION

The present invention relates to a bike trailer frame structure, more particularly to the technical field that involves a base frame connected and positioned with a rear frame through fixing holes or fixing grooves of a pivot base through positioning elements, so as to achieve the simplest structure of folding or unfolding in the front and rear directions, which can save components and simplify manufacturing, and can also save transportation volume and space in related technical fields.

In order to save transportation space and facilitate portability, the conventional bike trailer needs to provide a foldable structure of rear frame and base frame. The folding method can be roughly divided into left-right folding methods or front-back folding methods. After investigation, the commonly used front-back folding structure of rear frame and base frame requires additional folding linkage support brackets or other connecting pipes between the rear frame and the base frame to achieve front-back folding and unfolding actions. Therefore, not only are there many components, but the manufacturing assembly is also complex. The configuration is complicated and wastes manpower and working hours.

SUMMARY OF THE INVENTION

In view of this, the inventor of the present invention finally created and designed this bike trailer frame structure after continuous research, improvement and testing.

The main object of the present invention is to provide a trailer structure that simplifies the folding structure of the rear frame and the base frame in the front and rear directions. It has the practicality of having streamlined components, uncomplicated manufacturing, simple and convenient assembly, saving transportation space and meeting economic benefits.

The secondary object of the present invention is to provide a trailer structure, wherein without affecting the folding action of the rear frame and the base frame, additional hardware can be added between the rear frame and the base frame, then use soft materials to fix all the hardware between the rear frame and the base frame to support the required appearance and internal space, which can be used to produce trailers with different functions.

DETAILED DESCRIPTION OF THE INVENTION

Figure 1:
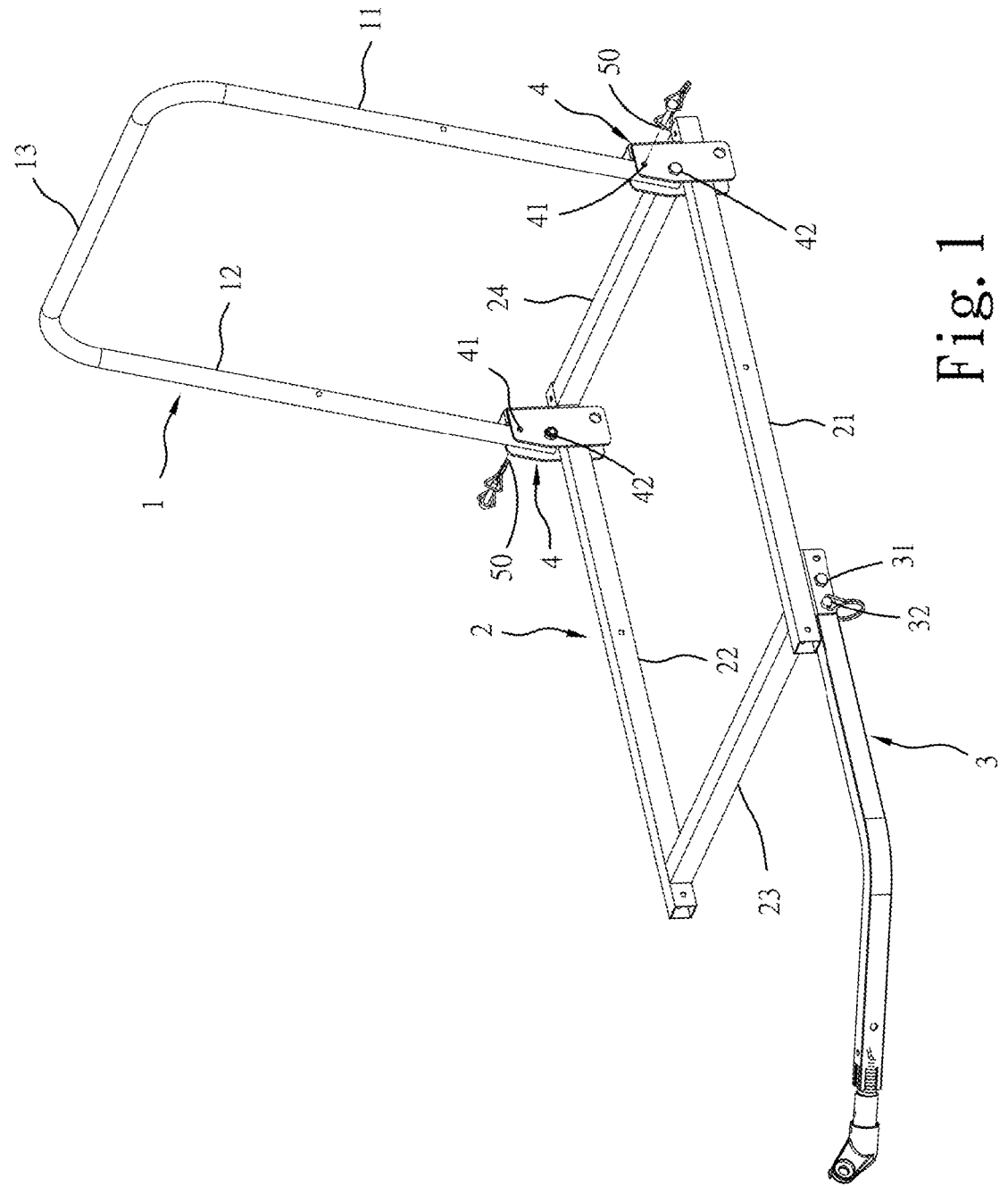
FIG. 1 is an oblique top elevational view of an embodiment of the present invention.
Figure 2:
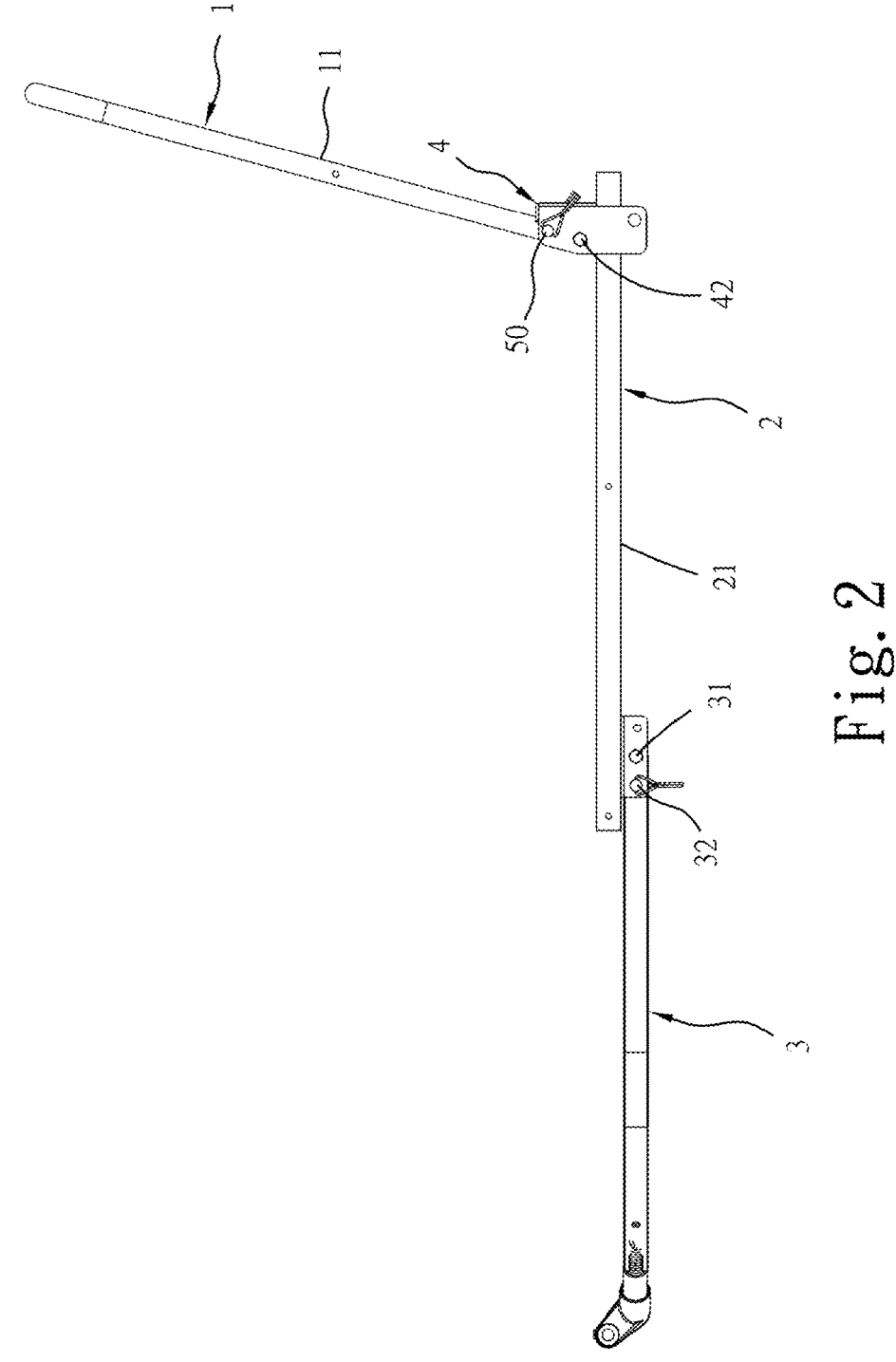
FIG. 2 is a side plan view of the embodiment of the present invention.

As shown in FIGS. 1 and 2, the invention is a bike trailer frame structure, which comprises a rear frame 1 and a base frame 2.

The rear frame 1 comprises a left side tube 11, a right side tube 12, and a connecting tube 13 connected between the left side tube 11 and the right side tube 12.

Figure 3:
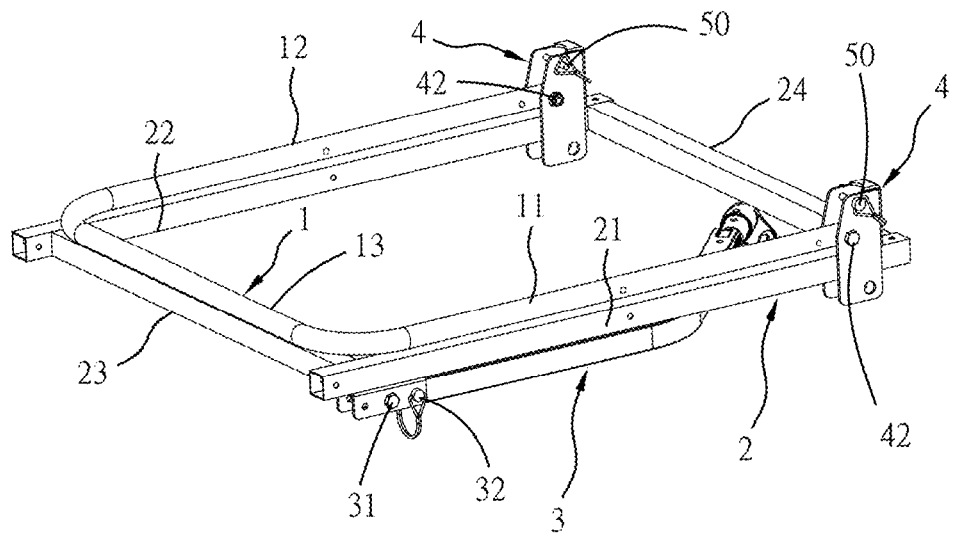
FIG. 3 is an oblique top elevational view of the folded state of the embodiment of the present invention.
Figure 4:
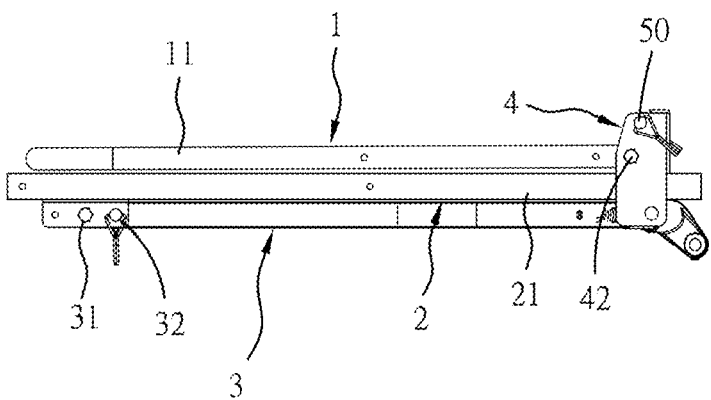
FIG. 4 is a side plan view of the folded state of the embodiment of the present invention.

The base frame 2 comprises a left bracket 21, a right bracket 22, a front bracket 23 connected between the left bracket 21 and the right bracket 22, and a rear bracket 24 connected between the left bracket 21 and the right bracket 22. The base frame 2 has a rear side thereof movably connected to a bottom side of the rear frame 1, and the left bracket 21 (or right bracket 22) of the base frame 2 has a front side thereof movably connected to a tow bar 3 in a pivotal or detachable manner. In this embodiment, the tow bar 3 is pivotally connected to the front side of the left bracket 21 through a pivot 31 and is further connected and positioned through a movable latch 32. When the movable latch 32 is taken out, the tow bar 3 can pivot and fold toward the bottom of the base frame 2 (see also FIGS. 3 and 4). Or the tow bar 3 can also be detachably connected to the front side of the left bracket 21. The tow bar 3 disassembled in this way (this detachable connection method is a common technology and is not explained in the figure) can also be placed under the base frame 2, which can also save transportation space, and the front side of the tow bar 3 is used to connect a bicycle (not shown).

Its characteristics are:

The left bracket 21 and the right bracket 22 of the base frame 2 each have an opposing rear side respectively connected to a left or right pivot base 4. The left and right pivot bases 4 each have a fixing hole 41 or fixing groove (not shown) respectively connected to a bottom side of the left side tube 11 or right side tube 12 of the rear frame 1 through a respective positioning element 50.

Thereby, when the left and right positioning elements 50 are released, the rear frame 1 can pivot toward the base frame 2 and fold (refer to FIGS. 3 to 4), or can pivot in the direction opposite to the base frame 2, and then fix the left and right positioning elements 50 to the fixing holes 41 or fixing grooves of the left and right pivot bases 4 to complete the unfolding action (refer to FIGS. 1 and 2). Therefore, the invention simplifies the folding structure of the rear frame 1 and the base frame 2 in the front and rear directions. It has the practicality of streamlined components, uncomplicated manufacturing, simple and convenient assembly, and saving transportation space and economic benefits.

Furthermore, the length of the rear frame 1 and the length of the base frame 2 are both less than 40 inches.

In addition, the rear side of the base frame 2 is movably connected to the rear frame 1 by the left and right pivot bases 4 through pivot elements 42 respectively.

In addition, the left and right pivot bases 4 can be connected to the left bracket 21 and the right bracket 22 of the base frame 2 through screw locking, welding fixation, riveting fixation, or by the engagement between engaging slots and engaging blocks. With different connection methods, you can also choose to use suitable materials such as iron, plastic, aluminum or alloy.

In addition, the left and right positioning elements 50 can be quick latches, elastic latches, latches, screws, movable tenons and other equivalent elements with positioning functions.

Figure 5:
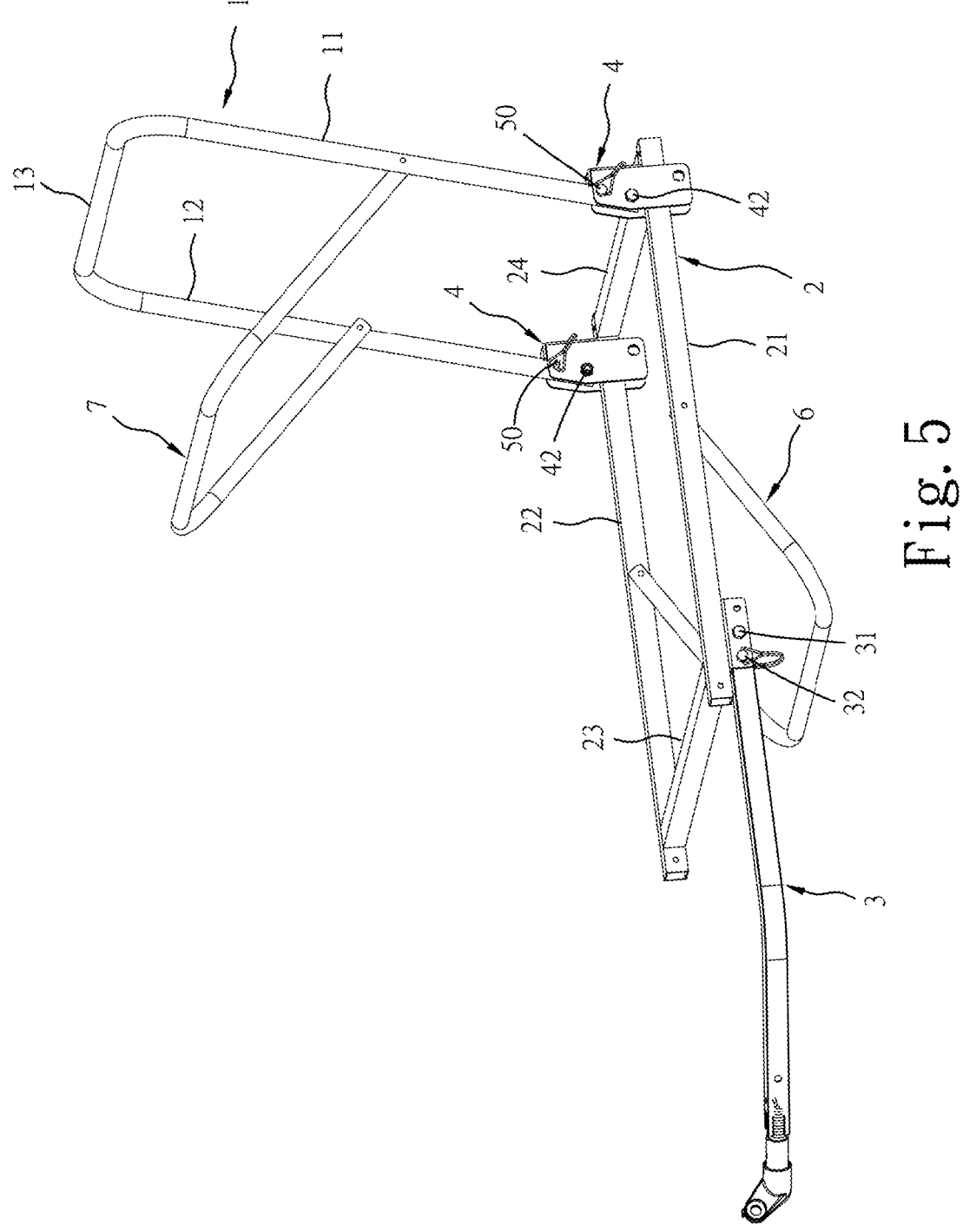
FIG. 5 is an oblique top elevational view of an alternate form of the present invention.
Figure 6:
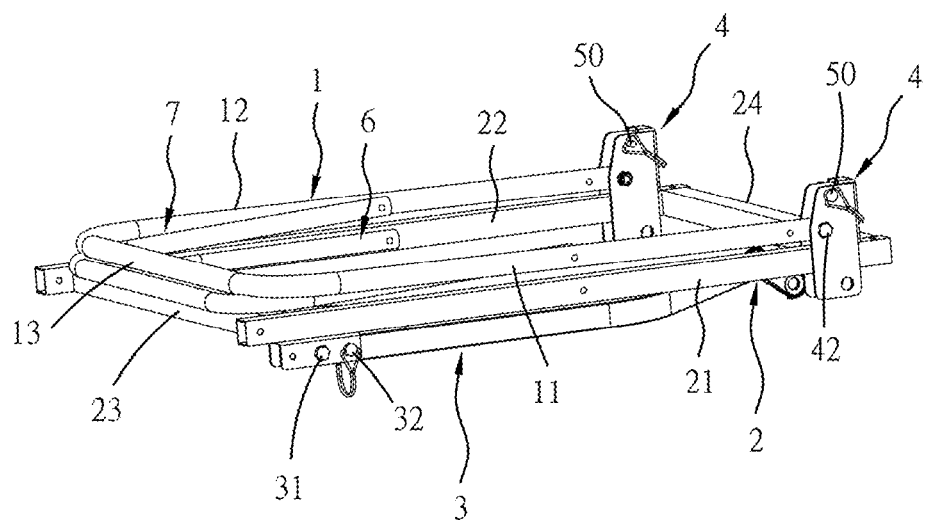
FIG. 6 is an oblique top elevational view of the folded state of the alternate form of the present invention.

Please also refer to FIGS. 5 and 6, which show another embodiment of the present invention. Its main technical content and features are the same as those of the above first embodiment. The difference is that a foot bar 6 and a canopy support bar 7 are additionally installed. When folded (refer to FIG. 6), it still has the practicality of saving transportation space.

To sum up, the present invention can be summarized as having the following promotional effects:

1. The invention simplifies the folding structure of the rear frame 1 and the base frame 2 in the front and rear directions. It has the practicality of streamlined components, uncomplicated manufacturing, simple and convenient assembly, and saving transportation space and economic benefits. In other words, there is no need to add any additional folding linkage support brackets or other connecting pipes between the rear frame 1 and the base frame 2 to achieve the purpose of folding and unfolding in the front and rear directions.

2. Without affecting the folding action of the rear frame 1 and the base frame 2, additional hardware (such as iron and aluminum pipe fittings, plastic strips, iron wires, etc.) can be added between the rear frame 1 and the base frame 2, then use soft materials (such as fabric, rope or steel cable, etc.) to fix all the hardware between the rear frame 1 and the base frame 2 to support the required appearance and internal space, which can be used to produce trailers with different functions.

What is claimed is:

1. A bike trailer frame structure, comprising:

a rear frame comprising a left side tube, a right side tube, and a connecting tube connected between said left side tube and said right side tube; and a base frame comprising a left bracket, a right bracket, a front bracket connected between said left bracket and said right bracket and a rear bracket connected between said left bracket and said right bracket, said base frame having a rear side thereof movably connected to a bottom side of said rear frame, one of said left bracket and said right bracket of said base frame having a front side thereof movably connected to a tow bar that has a front side thereof used to connect a bicycle;

wherein:

said left bracket and said right bracket of said base frame each have an opposing rear side respectively connected to a left pivot base and a right pivot base, said left pivot base and said right pivot base each having a fixing hole (fixing groove) respectively connected to a bottom side of said left side tube and a bottom side of said right side tube of said rear frame through a respective left positioning element and a respective right positioning element;

thereby, when said left positioning element and said right positioning element are released, said rear frame is able to pivot toward said base frame and fold, and is able to pivot in the direction opposite to said base frame and then fix said left positioning element and said right positioning element to the said fixing holes (said fixing grooves) of said left pivot base and said right pivot base.

2. The bike trailer frame structure as claimed in claim 1, wherein said rear frame and said base frame each have a length said base frame each have less than 40 inches.

3. The bike trailer frame structure as claimed in claim 1, wherein the rear side of said base frame is respectively movably connected to said rear frame by said left pivot base and said right pivot base through a respective pivot element.

4. The bike trailer frame structure as claimed in claim 1, wherein said left pivot base and said right pivot base are selectively connectable to said left bracket and said right bracket of said base frame through screw locking, welding fixation, or riveting fixation.

5. The bike trailer frame structure as claimed in claim 1, wherein said left pivot base and said right pivot base are selectively made of iron, plastic, aluminum or alloy.

6. The bike trailer frame structure as claimed in claim 1, wherein said left positioning element and said right positioning element are selectively quick latches, elastic latches, latches, screws, or movable tenons.

* * * * *